A. H. LEACH.
Carriage Wheel.
No. 102,280. Patented April 26, 1870.
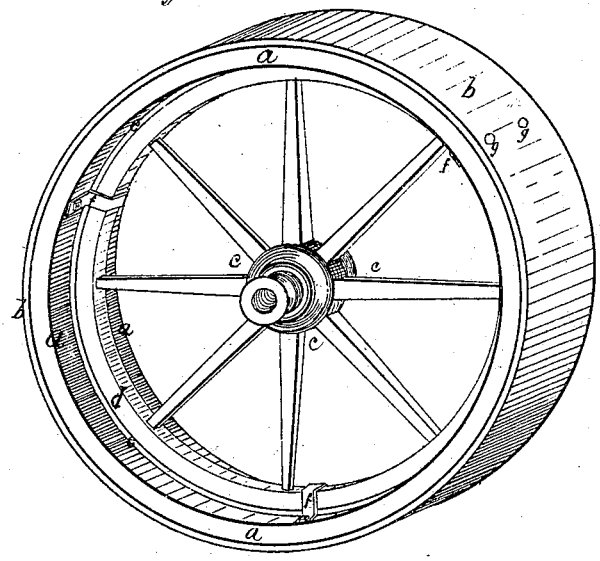
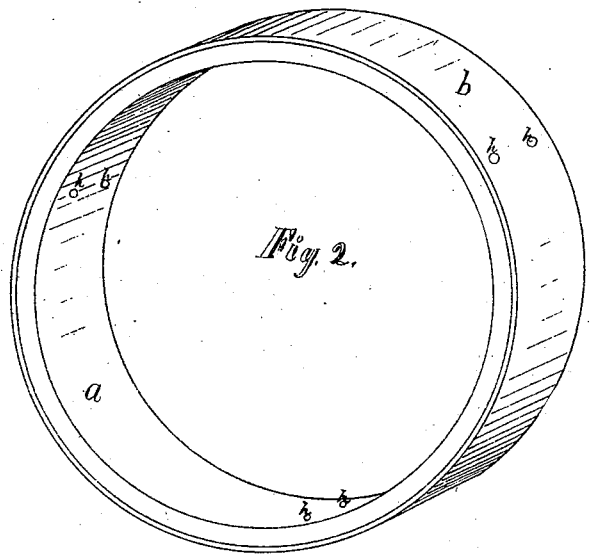
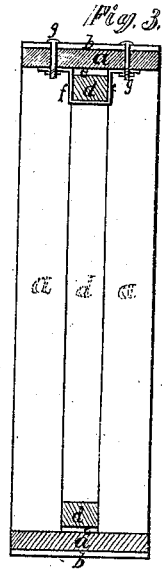

United States Patent Office.

ADIN H. LEACH, OF MARATHON, NEW YORK.

Letters Patent No. 102,280, dated April 26, 1870.

IMPROVEMENT IN CARRIAGE-WHEELS.

The Schedule referred to in these Letters Patent and making part of the same

I, ADIN H. LEACH, of the town of Marathon, in the county of Cortland and State of New York, have invented certain Improvements in Carriage-Wheels, of which the following is a specification.

My invention relates to the combination of ordinary carriage-wheels, wide felloes, and tire, clasps, bolts, and nuts, in such a manner that the same shall be capable of forming a wheel with a wide surface or track, the object of my invention being to form a wide-track wheel from an ordinary one, to be used in wet weather, on marshy or meadow grounds, and prevent the wheel sinking in the mud or marsh, as ordinary wheels do.

I will now proceed to describe my invention, so that those skilled in the art may be enabled to make and use the same, reference being had to the accompanying drawings forming a part of this specification, in which—

Figure 1 is a perspective view of my invention;

Figure 2 is a perspective view of the wide felloe and tire used by me; and

Figure 3 is a sectional view of my invention, cut away in such manner as to show the process of applying the same.

Similar letters of reference indicate like parts.

$a$ is a wide felloe.

$b$ is a wide tire placed around the wide felloe $a$.

$c\ c$ are the spokes and hubs of a common wheel.

$d$ is the felloe to the same.

$e$ is the tire to the same.

$f$ is a clasp or strap, of iron or steel, to pass over the felloe and tire of the common wheel $c\ d\ e$.

$g\ g$ are bolts passing through through the wide felloe and tire $a\ b$ and the clasp or strap $f$.

$h\ h$ are holes through the wide felloe and tire $a\ b$, to receive the bolts $g\ g$, the said bolts $g\ g$ being held in position by means of nuts on the inside of the wide felloe and tire, as is more fully shown in fig. 1 in the accompanying drawings.

The wide felloe and tire $a\ b$ is to be of sufficient circumference on the inside thereof to allow the same to pass over the outside of the wheel desired to be used in connection with the same, and, at the same time, fit it as tightly as may be, and should be about five or six inches wide, or of any other width, if desired.

Thus it will be seen that, by using an extra set of wide felloes and tire, any wheeled vehicle may be made into a truck or wide-track carriage whenever the same may be needed.

I claim the exclusive privilege of applying my invention to any kind of carriage or vehicle with wheels.

Having thus described my invention,

What I claim as new, and desire to secure by Letters Patent, is—

The combination of the wide felloe $a$, the wide tire $b$, the clasp or strap $f$, the bolts and nuts $g\ g$, and holes $h\ h$, with the ordinary wheels of any vehicle whatever, substantially as and for the purpose hereinbefore set forth.

Dated Marathon, N. Y., March 1, 1870.

ADIN H. LEACH.

Witnesses:
WM. J. MANTANYE,
E. W. STEPHENS.